UNITED STATES PATENT OFFICE.

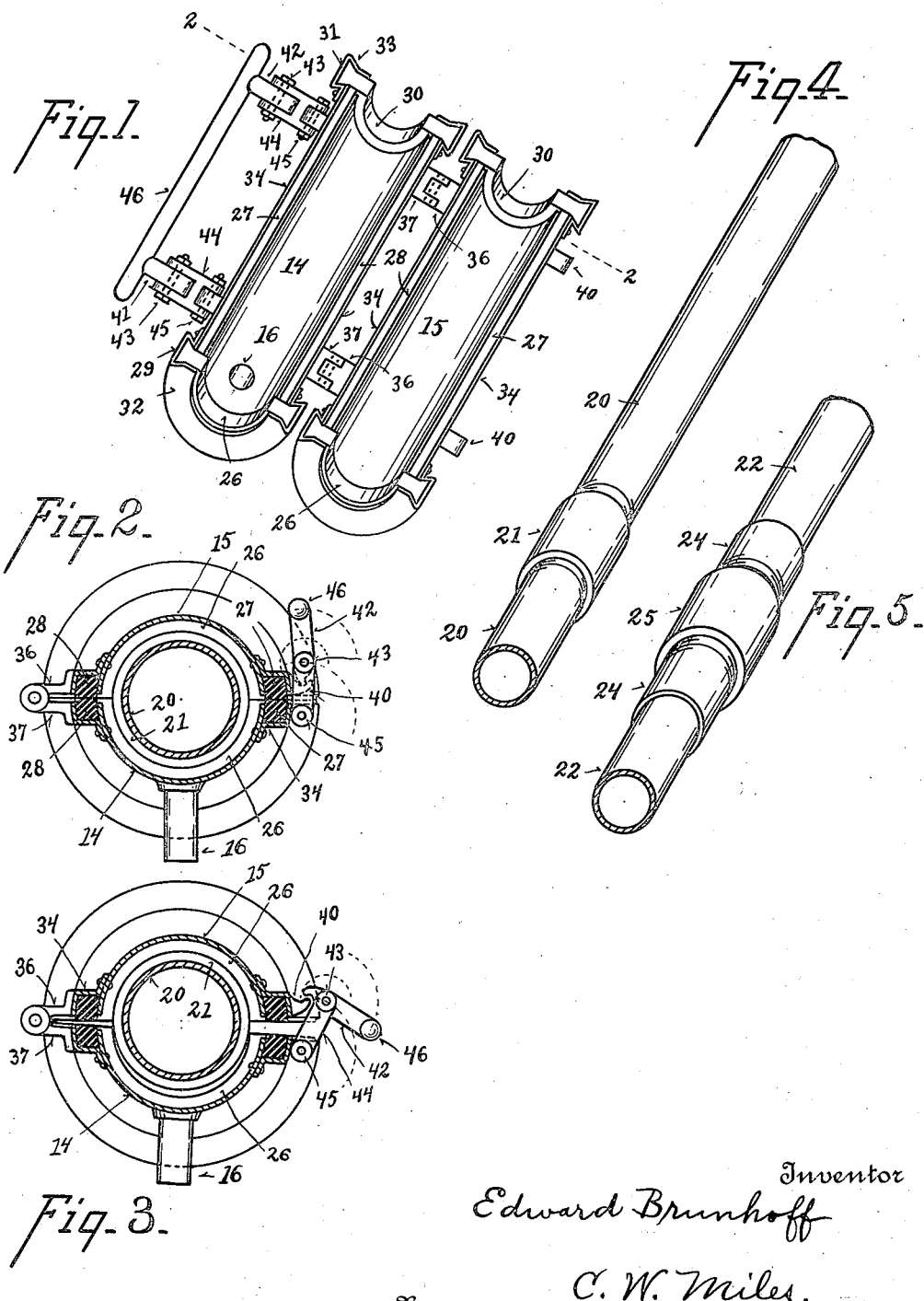

EDWARD BRUNHOFF, OF CINCINNATI, OHIO.

OIL-SAVING APPARATUS.

1,369,913.  Specification of Letters Patent.  Patented Mar. 1, 1921.

Application filed January 12, 1920. Serial No. 350,932.

*To all whom it may concern:*

Be it known that I, EDWARD BRUNHOFF, a citizen of the United States, residing at Cincinnati, in the county of Hamilton and State of Ohio, have invented certain new and useful Improvements in Oil-Saving Apparatus, of which the following is a specification.

My invention relates to improvements in oil saving devices to be employed in withdrawing the pipe or casing of oil wells. One of its objects is to provide a device applicable to the pipe joints while they are being disconnected of sufficiently light weight and convenient size to be readily handled in applying and removing. Another object is to provide a device adaptable to pipes having the same internal diameter but with different outside diameters, as for instance single, extra heavy, and reinforced pipe. Another object is to provide for effecting a sealed joint with both the upper and lower pipe sections where a joint is to be broken. Another object is to provide an improved lever mechanism for closing and sealing the joints and applying the strain at both ends of the saving device. My invention also comprises certain details of form, combination, and arrangement, all of which will be more fully set forth in the description of the accompanying drawings, in which:

Figure 1 is a perspective view of an oil saving device embodying my improvements.

Fig. 2 is a section on line 2—2 of Fig. 1.

Fig. 3 is a section also on line 2—2 illustrating a different position of the sealing lever mechanism.

Fig. 4 is a perspective view of a section of extra heavy wrought iron pipe, such as employed in oil wells.

Fig. 5 is a view similar to Fig. 4 of a section of reinforced pipe of the same internal diameter as Fig. 4, also employed in oil wells.

The accompanying drawings illustrate the preferred embodiment of my invention, in which 14 and 15 represent the opposite or counterpart sections of a longitudinally divided sleeve or jacket adapted to be temporarily clamped upon the pipe joints of an oil well as the pipe is being withdrawn and disjointed, for the purpose of catching the oil which escapes as each successive pipe joint is broken, and enables the escaping oil to be conducted away through a spout or branch conduit 16 to a barrel or tank, not shown where it can be stored for use.

In practice the oil well piping comprising a series of pipe sections 20 having walls of uniform thickness as in Fig. 4 and united by threading their ends into coupling or sleeve members 21, or of reinforced pipe sections 22 having thickened or reinforced walls at 24, at their ends where the threads are cut, and sleeve members 25, as shown in Fig. 5, are required to be withdrawn from the wells from time to time, which is done by lifting the piping from the well until one of the sleeves appears above the well curb, and then grasping the sleeve to prevent it from turning, and then unscrewing the pipe section above the sleeve therefrom, and then proceeding in like manner with the next section until all the piping has been removed from the well.

As the respective pipe sections being unscrewed are usually filled with oil, it is desirable to save the oil which would otherwise escape and be wasted when the respective pipe joints were broken. My improved sleeve is provided with a sectional packing ring 26 of yielding material, as for instance soft rubber, detachably inserted in an annular recess 29 at the bottom of the sleeve, and designed to interengage with the recesses to retain the ring sections in place and to fit tightly upon the exterior of the sleeve and to form a practically fluid tight joint therewith. Vertical packing strips of yielding material, 27 and 28 as for instance soft rubber are inserted in corresponding recesses longitudinally of the sleeve sections so as to meet face to face and close the vertical joints of the sleeve practically fluid tight. A sectional packing ring 30 of similar yielding material is inserted in an annular recess 31 at the upper end of the sleeve and is designed to interengage with the recess and to engage and make a practically fluid tight joint with the pipe section above the sleeve. A receiver is then adjusted to catch any oil flowing from the spout 16, and the pipe section above the pipe sleeve engaged by the oil saver is then turned, slipping rotatably in the upper packing ring 30, until the pipe joint is broken and the oil escapes into the sleeve and flows from the spout 16 to the receiver. If desired the spout 16 may be connected by a pipe or hose with a storage tank.

In practice it is desirable that the oil saving sleeve be of relatively light weight in order that it may be conveniently handled and adjusted by one or two operators, and in order to secure the requisite rigidity without excessive weight I preferably employ sleeve sections 14 and 15 of comparatively heavy sheet metal, to which are riveted or welded sheet metal sections 32 and 33 to form recesses 29 and 31 to receive the semi-annular packing ring sections 26 and 30, and at the same time reinforce and increase the rigidity of the sleeve sections 14 and 15 so that they will not be distorted and rendered useless when subjected to the strain of clamping them together upon the piping, or other strains to which they are liable to be subjected. The sheet metal sections 34 are riveted or welded to the sleeve sections 14 and 15 to provide recesses to receive the packing strips 27 and 28, and to add further to the rigidity of the sleeve sections.

The sections 14 and 15 are hinged together along one edge by means of hinge members 36 and 37, and at the opposite edge, and near opposite ends, so as to exert a clamping action positively at each end of the sleeve are latch members 40 which are respectively engaged by the free ends of the clamping levers 41 and 42, pivotally connected at 43 to the links 44, which are in turn pivotally connected at 45 to ears projecting from the section 14. The clamping levers 41 and 42 are preferably connected together by a handle or cross-bar 46, which enables both of said levers to be conveniently actuated at the same time by hand. The said clamping mechanism provides for a convenient initial engagement of the ends of the levers 41 and 42 with the respective latch members 40, even though the edges of the sleeve sections 14 and 15 are at first some distance apart, as shown in Fig. 3, and after such initial engagement to draw the two sleeve sections firmly together and clamp them with practically tight joints upon the pipe section and pipe sleeve. By adjusting the centers 43 and 45 into substantially the position shown in Fig. 2 with reference to the levers 41 and 42 and the handle 46, the center 43 is slightly past a dead center with the ends of the handle resting against the sleeve to limit further movement thereof toward the sleeve, thereby serving as an automatic lock to hold the sleeve section locked together until after the operation of saving the oil is completed, when the movement of the handle 46 in the opposite direction will quickly and readily unlock and release the sleeve sections, ready to be applied to the next pipe joint.

Since the outside diameter of say three inch standard pipe, three inch extra heavy pipe, and three inch reinforced pipe, and their respective coupling sleeves would be respectively different to such an extent as to make it difficult to employ an oil saving sleeve thereon without change or adjustment and secure tight joints, I provide for the employment of sectional packing members 26 and 30 of different thicknesses radially of the sleeve, and for the removal of one set and the substitution of another set of said packing sections, to provide for applying the single oil saving sleeve to said several types of pipe of a single internal diameter so as to secure tight joints with either type of pipe.

The apparatus herein illustrated and described is capable of considerable modification without departing from the principle of my invention.

What I claim is:

1. An oil saving device comprising sleeve sections hinged together and adapted to unite longitudinally thereof about a pipe and its coupling member to form a jacket space about the pipe joint to receive the oil when the joint is broken and conduct the oil to a receiver, said sleeve sections having circumferential recesses and sectional packing members of inter-locking cross-sectional pattern to inter-lock therewith and insertible and removable endwise therefrom to form at one end a tight joint with the pipe coupling member, and to form at the opposite end a tight joint with the pipe section.

2. An oil saving device comprising sleeve sections hinged together and adapted to unite longitudinally thereof about a pipe and its coupling member to form a jacket space about the pipe joint to receive the oil when the joint is broken and conduct the oil to a receiver, said sleeve sections having circumferential recesses at opposite ends adapted to receive interchangeably endwise sectional packing members of different thickness and to inter-lock with and retain said packing sections against displacement laterally to form at one end a tight joint with the pipe coupling member and to form at the opposite end a tight joint with the pipe section, said packing sections being interchangeable to adapt the sleeve to pipe members of different external diameters.

3. An oil saving device comprising sleeve sections hinged together and adapted to unite longitudinally thereof about a pipe and its coupling member to form a jacket space about the pipe joint to receive the oil when the joint is broken and conduct the oil to a receiver, said sleeve sections having circumferential recesses and sectional packing members of inter-locking cross-sectional pattern to interlock therewith against displacement laterally and insertible and removable endwise therefrom, and recesses provided with packing members at the meeting edges longitudinally of said sleeve sections to form tight joints between the meeting faces of sleeve sections and between the sleeve sections and pipe and pipe coupling.

4. An oil saving device comprising sleeve sections hinged together and faced with yielding packing material and provided with latch members near opposite ends, pivotally mounted locking levers near opposite ends of said sleeve sections to engage said latch members across one of the sleeve joints, and an actuating member common to both of said locking levers, whereby the sleeve members are simultaneously locked together near opposite ends.

5. An oil saving device comprising sleeve sections hinged together and faced with yielding packing material, latch members carried by one of said sleeve members near opposite ends, and a yoke-shaped locking lever pivotally connected near opposite ends by means of links to the opposite sleeve member and adapted to engage with its opposite projecting ends across one of the sleeve joints with said latch members to lock said sleeve sections together upon a pipe.

In testimony whereof I have affixed my signature.

EDWARD BRUNHOFF.